United States Patent [19]

Rist et al.

[11] 3,769,575
[45] Oct. 30, 1973

[54] METAL DETECTOR USING RADIO RECEIVER AND R-F PROBE
[75] Inventors: Bruno A. Rist; James L. Tanner, both of Los Angeles, Calif.
[73] Assignee: Tanner Electronic Systems Technology, Inc., Northbridge, Calif.
[22] Filed: June 30, 1971
[21] Appl. No.: 158,245

[52] U.S. Cl. .................................... 324/3, 324/41
[51] Int. Cl. ............................................. G01v 3/12
[58] Field of Search .......................... 324/3, 67, 41; 340/258 C

[56] References Cited
UNITED STATES PATENTS
3,626,279   12/1971   Walden .................................. 324/3
3,492,564   1/1970   Baker .................................... 324/3

OTHER PUBLICATIONS
Calvert, Frederick H., Simple Metal Locator, "Electronics World," July, 1961, p. 73
Klippberg, Olle, Underwater Metal Hunting for Fun or Profit, "Radio–Electronics," June, 1966, pp. 38, 39
Miessner, B. F., Simplified Metal Locator, "Radio Electronics," Sept., 1962 pp. 33–35
Parker, Harry D., Transitone Locates Hidden Wiring, "Radio Electronics," Dec. 1960, p. 35

*Primary Examiner*—Gerard R. Strecker
*Attorney*—Richard Morganstern et al.

[57] ABSTRACT

A metal locating system is disclosed wherein a unitary R-F oscillator is disposed on a probe board including all necessary electrical components thereof and its power supply. The oscillator is operated at a frequency such that a harmonic thereof falls within the range of and is beat against the local oscillator signal of a typical inexpensive superheterodyne broadcast radio receiver. The receiver is used as a detector and produces an audible heterodyne whistle or beatnote. When the probe board is brought in proximity to a metallic object the R-F oscillator frequency is varied to produce an audible change in the beatnote frequency. The radio may be located remotely from the probe as, for example in the user's pocket.

4 Claims, 5 Drawing Figures

PATENTED OCT 30 1973 3,769,575
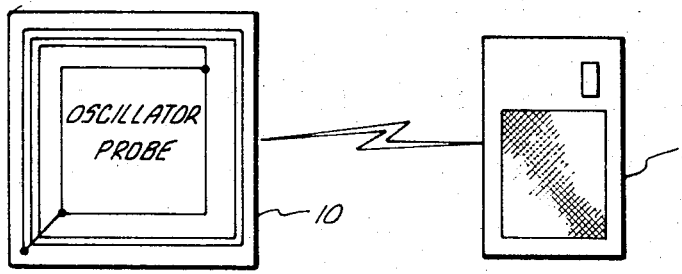
FIG. 1.  FIG. 2.
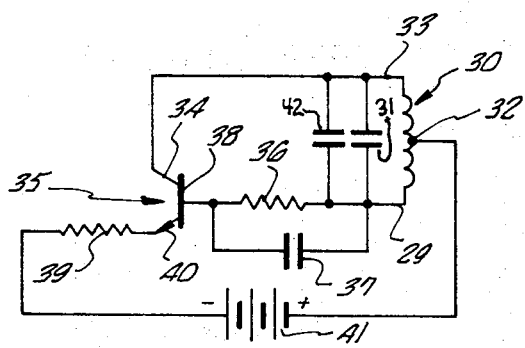
FIG. 3.
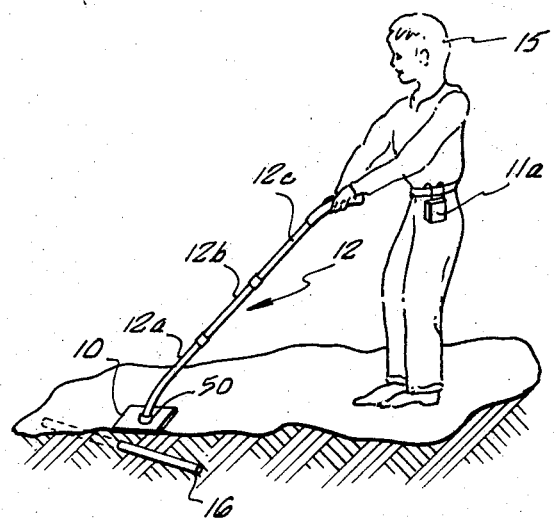
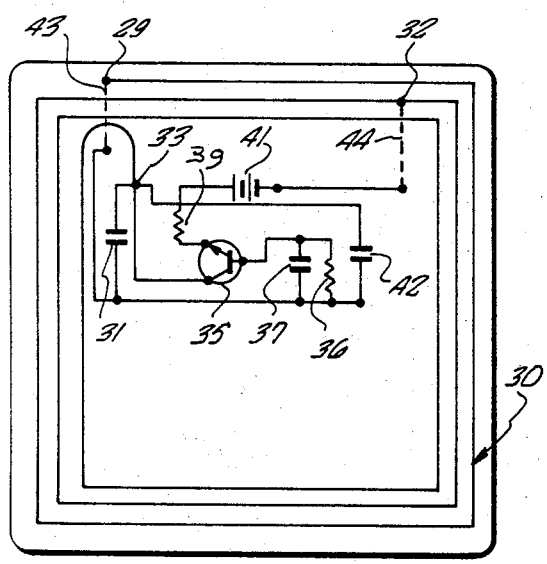
FIG. 4.
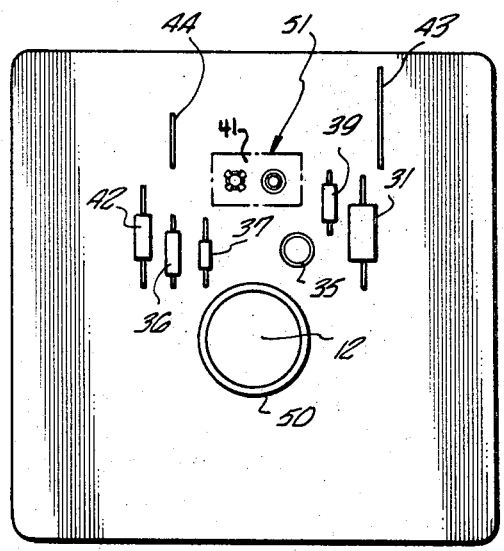
FIG. 5.
INVENTORS.
BRUNO A. RIST
JAMES L. TANNER
BY Norman L. Chalfin

METAL DETECTOR USING RADIO RECEIVER AND R-F PROBE

BACKGROUND OF THE INVENTION

1. Field of the Invention

The field of this invention is metal locating systems and more particularly such systems where a radio-frequency generating probe is varied in frequency when its radiating field is brought in proximity to a metallic object with the resultant change in the oscillating frequency of the probe being indicated by an audible signal.

2. Description of the Prior Art

Metal locating systems utilizing radio-frequency generating probes are known. Such known prior art systems are generally of two types. The first type includes two R-F oscillators which are operated at respectively different frequencies. The frequency difference is chosen to be within the audible range. The oscillators are coupled in common to a diode detector to which a pair of earphones is typically connected. The audible difference frequency requency is heard in the earphones. One of the oscillators operated with its frequency determining coil disposed so as to be affected by metal coming within its field. The other oscillator is operated so as to have its frequency independent of the presence of a metallic object. Thus the audible difference frequency or beatnote heard in the earphone changes as a metallic object is approached. This type of system has the disadvantage of requiring the wearing of earphones. Further, complex circuitry is needed to effect the coupling between the two R-F sources and the detector. Two separate specially designed R-F oscillators are required and particular care is required in positioning the oscillators so that interaction between them does not provide spurious output signals.

The second type of prior art metal locating system also uses an R-F oscillator having a frequency determining probe coil disposed so as to be affected by the proximate presence of a metal. A radio receiver is tuned to a nearby broadcasting station. The probe oscillator is adjusted until its frequency and the frequency of the broadcast station differ by a frequency within audible range. This difference is heard in the receiver. The receiver may be of any type, tuned R-F, or superheterodyne. There must be a radio station in the vicinity. This approach suffers from the disadvantage that the R-F probe oscillator causes interference with commercial broadcast reception. Further, it is necessary to have a detectable broadcasting station in the area of use.

SUMMARY OF THE PRESENT INVENTION

The present invention provides a much simpler, more economical and otherwise improved metal locating system. In the present invention a novel approach has been taken to the generation of the audible beat note or difference frequency which neither requires the wearing of earphones by the user, nor does it cause interference with commercial broadcast reception. The circuits are extremely simple and economical and permit the use of a low cost transistor superheterodyne radio receiver as a detector.

The new system of this invention consists of a unitary radio-frequency oscillator preferably disposed on a printed circuit board. All of the capacitors and resistors forming the oscillator circuit along with the frequency determining coil are assembled on the board, together with the transistors and a battery. A frequency determining inductor coil is defined by a printed wire web disposed about the periphery of the printed circuit board. The board is attached to a long probe handle for easy positioning adjacent a surface area being searched. The R-F oscillator and probe coil thus form an integral part of the probe. Remote connection to detection apparatus is not required.

The detector oscillator probe is preferably used together with a small, inexpensive, superheterodyne receiver of the battery-operated, transistor type, commonly available. It is unnecessary to use a high quality receiver for proper operation of the system of the invention. The probe oscillator is operated at a frequency such that a harmonic of the probe oscillator fundamental, generated in the second detector of the receiver, produces a beatnote with the local oscillator of the low cost superheterodyne receiver. The probe frequency, in other words, is preferably operating at about one-half the local oscillator frequency.

As has been pointed out earlier the general operation of metal locating systems utilizing R-F generating probes involves the production of a beatnote in the audible frequency range between a probe oscillator and a second oscillator. When the probe oscillator is brought near a metal object the probe oscillator frequency is changed due to the change in reactance of the probe coil as a result of interaction with the metallic material. When the probe frequency is beat against another source of R-F energy in an appropriate detector an audible tone is heard. In the prior art systems, discussed above, the other sources of R-F energy were either a separate customized and isolated oscillator or a local broadcast station. The present invention requires neither a second customized or isolated oscillator, nor the presence of a broadcast station.

The present invention utilizes a probe oscillator operating at a relatively low frequency and a common superheterodyne radio receiver. In such receivers the intermediate frequency amplifiers are relatively broad band. The local oscillator and the harmonic of the probe oscillator, cooperate to produce an audible beatnote heard from the radio receiver. This in part is due to the fact that the local oscillator of such receivers generates an extremely high voltage compared to the signals being received. This is necessary in such receivers to achieve an adequate signal-to-noise characteristic for ordinary reception. The local oscillator in fact can "swamp" the I-F. This has no effect, ordinarily, because the presence of the radio signal produces a much stronger intermediate frequency signal. One can demonstrate the effect by observing on an oscilloscope that the local oscillator signal is present at the second detector input in the absence of broadcast signals despite the normal attenuation of the I-F amplifier at this frequency.

Thus, when the R-F probe signals of this invention are picked up by the inexpensive receiver at a frequency near the low frequency end of the broadcast band, the probe signal harmonic and the local oscillator frequency generated in the second detector of the receiver cooperate to produce the audible beat frequency. This beat frequency has been observed in an area where no broadcast stations are in close enough range to be detected at all.

BRIEF DESCRIPTION OF THE FIGURES

FIG. 1 is a functional block diagram of the invention,

FIG. 2 is a physical configuration of the invention as it is used showing the several parts, FIG. 3 is a schematic circuit diagram of the oscillator probe circuit, FIG. 4 is a diagram of the printed circuit board as seen from the circuit web side; and FIG. 5 is a diagram of the printed circuit board of the oscillator of the invention from the component side.

DESCRIPTION OF THE PREFERRED EMBODIMENTS

As may be seen in the block diagram, FIG. 1, the metal locating system of this invention includes an oscillator probe board 10 and a superheterodyne radio receiver 11 located remotely from the probe board 10. Energy generated by the oscillator probe board in the form of a radio-frequency (R-F) signal is radiated to the radio receiver where the R-F probe oscillator signal or a harmonic thereof is heterodyned against the local oscillator of the superheterodyne transistor receiver. The receiver is preferably of the low cost type widely available in electronics stores and many other emporia. Such a receiver includes at least a tunable local oscillator, a second detector and an audio amplifier and loudspeaker.

The mechanics of the heterodyne action is further delineated hereinbelow.

The physical arrangement of the components of the metal locator system is illustrated in FIG. 2. The oscillator probe board 10 is attached rigidly to the end of a probe stick 12. The stick may be a unitary structure or one which is sectioned, as shown at 12a, b, c for easy disassembly and storage. The receiver 11 may be clamped to the end of the probe stick 12 remote from board 10 by any suitable means such as a resilient band or clip (not shown). Alternately it may be attached to the person of the user 15 as indicated at 11a in FIG. 2. As may be seen in FIG. 2 the user 15 holds the probe stick 12 in his hand and moves the oscillator probe board 10 over the area being searched. The signal from the probe oscillator on board 10 causes a heterodyne whistle to be heard in the receiver as hereinafter described. If metal, as indicated at 16 in FIG. 2, is present beneath the probe plate 10 on or under the surface of the area being probed a change in frequency of the heterodyne whistle will be heard. By the change in frequency the user will be altered to the presence of metal.

FIG. 3 is a schematic circuit diagram of the R-F oscillator of the present invention. As shown, it includes a tapped coil 30, tuned by a capacitor 31. The capacitor 42 in parallel with a second capacitor 31 used for frequency adjustment. One end 33 of coil 30 is connected to the collector 34 of a transistor 35. The other end 29 of coil 30 is connected to a base bias resistor 36 and a by pass capacitor 37. Resistor 36 and capacitor 37 are connected in parallel. The other side of the parallel connected resistor and capacitor is connected to the base 38 of transistor 35. A resistor 39 is connected from the emitter 40 of transistor 35 to the negative side of a battery 41. The positive side of battery 41 is connected to the tap 32 of coil 30.

As may be seen in FIG. 4, the oscillator coil 30 is preferably in the form of a printed metal web. The web is positioned on one surface of and about the periphery of rigid board 10 and is preferably arranged in a rectangular helix of decreasing dimensions. The remaining components of the oscillator are identified by the same symbols 35–41 as used in the circuit of FIG. 3.

In FIG. 5 the reverse or component side of the board 10 is shown. The components thereon are identified as in FIG. 3. Jumper wires 43, 44 interconnect wires from the circuit web side avoiding the necessity for dual clad printed circuit material which would otherwise be needed to avoid circuit cross-overs.

The R-F oscillator shown in FIG. 3 is commonly known as a "Hartley" oscillator. Any oscillator which can produce a radiating radio-frequency signal preferably in the vicinity of the low frequency end of the range of typical broadcast radio receivers may be used as the R-F oscillators.

As seen in FIG. 5 a receptacle cup 50 on board 10 accepts the end of probe stick 12. A battery terminal clip 51 accepts the battery 41. As has been previously pointed out the R-F oscillator generates a radio frequency signal which is radiated to receiver 11. The oscillator frequency is received in the second detector of the I-F system where a harmonic of the probe oscillator heterodynes with the local oscillator of receiver 11 to produce a whistle (beat frequency) when the receiver is tuned to a frequency such that the local oscillator is nearly double the R-F probe oscillator frequency. As the coil web 30 is brought proximate to a metallic object the reactance of coil 30 is changed resulting in a shift in the frequency of oscillation and, correspondingly, a shift in the pitch of the heterodyne whistle which is heard in the loudspeaker of receiver 11. The change in heterodyne whistle frequency or pitch indicates the presence of metal.

The circuit action which is believed to be responsible for the operation of the invention to produce the heterodyne whistle heard from the inexpensive transistor receiver is as follows: When the R-F oscillator on probe board 10 is energized it produces a radio-frequency signal near the low frequency end of the tuning range of the superheterodyne receiver 11. Because of the relatively wide-band capture range of the intermediate frequency amplifier of a typical inexpensive superheterodyne receiver, this signal passes through the I-F amplifier. A harmonic of the R-F signal is generated in the second detector of the superheterodyne receiver. This harmonic is close to the frequency of the local oscillator. The frequency difference between the local oscillator and the R-F oscillator harmonic frequency (generated in the second detector) is in the audible range. The two signals (local oscillator and R-F harmonic) produce an audible whistle. Any change in frequency of the R-F oscillator changes the frequency of this whistle to indicate the presence of metal near the probe board.

In explanation of how the local oscillator frequency and the second detector generated harmonic of the R-F oscillator of this invention can be produced by the second detector (which normally follows the intermediate frequency amplifier of the receiver), consider that the local oscillator of this receiver generates a signal having a very high voltage level compared to signals produced elsewhere in typical low cost superheterodyne receivers. This is preferred in such receivers to produce a good signal-to-noise ratio when the receiver is used in its normal function. It can be demonstrated by placing a tuned oscilloscope on the second detector, that a substantial local oscillator voltage is present at the second detector when the receiver is tuned at the low frequency end of its tuning range. It has been found that the beat frequency whistle is derived from detector action at the second detector in response to both the local oscillator and the beating signal derived from the harmonic of the R-F probe oscillator. The harmonic of the probe (R-F) oscillator is generated in the second detector because of its non-linearity.

We claim:

1. A metal locator system comprising:

a probe mounting member;

an oscillator probe attached to said member and having an oscillator disposed thereon for generating and radiating a radio signal of a frequency within the capture range of a common radio receiver's intermediate frequency amplifier, the frequency of said radio frequency signal varying as a function of the proximity of said probe to a metallic object; and a superheterodyne radio receiver including at least a local oscillator and a second detector positioned proximate said probe, said receiver being tunable to a frequency such that said local oscillator signal is heterodyned by a suitable harmonic of the radio frequency produced by said oscillator probe to produce an audible whistle from said receiver, said harmonic being generated in said second detector;

whereby when said oscillator probe is positioned proximate to a metallic object, the radio frequency being radiated thereby is changed to produce a change in the frequency of said whistle to indicate the presence of the metallic object.

2. A metal locating system comprising:

a probe mounting member;

oscillator probe means disposed on said probe mounting member for generating a radiating radio-frequency signal the frequency of which is within the capture range of a common radio receiver's intermediate frequency amplifier and varies as a function of the proximity of said probe to a metallic object;

a heterodyne receiver located proximate said probe means and having its local oscillator tunable to a frequency differing from a harmonic of said probe radio-frequency signal by a frequency difference within the audible range, whereby when said probe means is moved proximate a metal object said heterodyne receiver will produce an audible signal which varies in pitch due to the interaction of said metal object with said probe means.

3. The system of claim 2 wherein said oscillator in said probe means comprises:

a printed circuit board having the oscillator circuit components and the battery power supply therefor positioned thereon.

4. The method of producing an audible signal to identify the presence of metal, comprising the steps of:

generating a radiating R-F signal at a frequency such that said signal is within the frequency range of a common radio receiver's intermediate frequency amplifier capture range;

generating a local oscillator signal in a superheterodyne radio receiver at a frequency differing from a harmonic of said R-F signal by a frequency difference within the audible range;

detecting the local oscillator signal and generating the harmonic of said R-F signal in the second detector part of the I-F amplifier of the superheterodyne receiver to produce an audible beat note signal in the audio amplifier of said superheterodyne receiver; and changing the frequency of the R-F radiating signal and the harmonic thereof as a metallic object is approached to produce a change in the frequency of the audible frequency in said audio amplifier.

* * * * *